(12) United States Patent
Berruet et al.

(10) Patent No.: US 9,441,722 B2
(45) Date of Patent: Sep. 13, 2016

(54) MECHANICAL SYSTEM FORMING A CAM FOLLOWER OR A ROCKER ARM, INCLUDING AN INNER CAVITY ADAPTED TO CONTAIN AN OIL BATH

(71) Applicants: Nicolas Berruet, Artannes sur Indre (FR); Benoît Hauvespre, Saint Etienne de Chigny (FR); Samuel Viault, Saint-Antoine-du-Rocher (FR)

(72) Inventors: Nicolas Berruet, Artannes sur Indre (FR); Benoît Hauvespre, Saint Etienne de Chigny (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/716,934

(22) Filed: May 20, 2015

(65) Prior Publication Data

US 2015/0337940 A1 Nov. 26, 2015

(30) Foreign Application Priority Data

May 22, 2014 (EP) .................... 14305754

(51) Int. Cl.
| | |
|---|---|
| *F16H 53/06* | (2006.01) |
| *F02M 59/10* | (2006.01) |
| *F01L 1/14* | (2006.01) |
| *F01L 1/18* | (2006.01) |
| *F01M 9/10* | (2006.01) |
| *F02M 63/00* | (2006.01) |

(52) U.S. Cl.
CPC .............. *F16H 53/06* (2013.01); *F01L 1/143* (2013.01); *F01L 1/18* (2013.01); *F01M 9/10* (2013.01); *F02M 59/102* (2013.01); *F02M 63/0001* (2013.01); *F01L 2105/00* (2013.01); *F01L 2810/02* (2013.01); *Y10T 74/2107* (2015.01)

(58) Field of Classification Search
CPC ....... F02M 59/102; F01M 9/104; F01L 1/18; F01L 1/185; F01L 1/143; F01L 1/14; F01L 2810/02; F01L 2105/02; Y10T 74/2107; Y10T 74/20882; F16H 53/06
See application file for complete search history.

(56) References Cited

U.S. PATENT DOCUMENTS

| | | | |
|---|---|---|---|
| 2,385,309 A | 9/1945 | Spencer et al. | |
| 4,614,171 A | 9/1986 | Malhotra | |
| 4,708,102 A * | 11/1987 | Schmid | F01L 1/14 123/90.35 |
| 5,566,652 A | 10/1996 | Deppe | |
| 8,464,678 B1 | 6/2013 | Iskenderian | |
| 2008/0308052 A1 | 12/2008 | Sugie et al. | |

FOREIGN PATENT DOCUMENTS

| | | |
|---|---|---|
| DE | 4334518 A1 | 4/1994 |
| DE | 19705726 A1 | 8/1998 |
| DE | 102006031032 A1 | 1/2008 |
| EP | 460988 A1 | 12/1991 |
| EP | 2607636 A1 | 6/2013 |

(Continued)

*Primary Examiner* — Thomas Diaz
(74) *Attorney, Agent, or Firm* — Bryan Peckjian; SKF USA Inc. Patent Dept.

(57) ABSTRACT

A mechanical system, forming a cam follower or a rocker arm, the mechanical system comprising: a support element; a pin extending between two opposite ends along a first axis and supported by the support element; and a roller movable in rotation relative to the pin around the first axis and adapted to roll on a cam. The support element includes an inner cavity in which the roller is at least partially arranged and which is adapted to contain an oil bath for lubricating the roller. Examples of applications for the mechanical system include a follower device, an injection pump or a valve actuator.

17 Claims, 3 Drawing Sheets

(56) References Cited

FOREIGN PATENT DOCUMENTS

| EP | 2677124 A1 | 12/2013 |
| JP | 2000356117 A | 12/2000 |
| WO | 2006108483 A1 | 10/2006 |

* cited by examiner

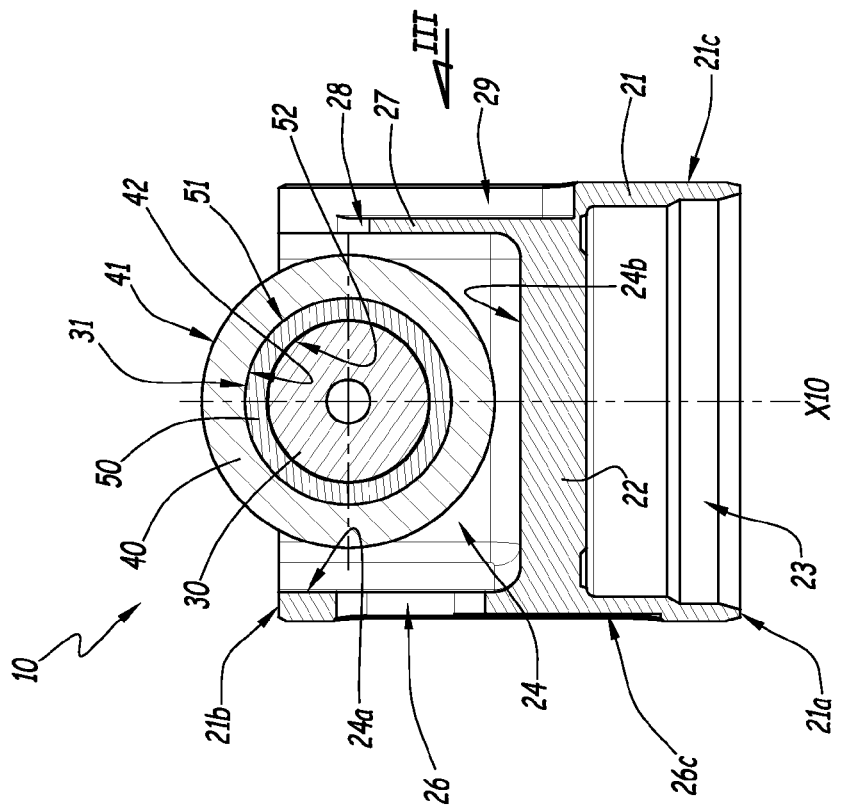
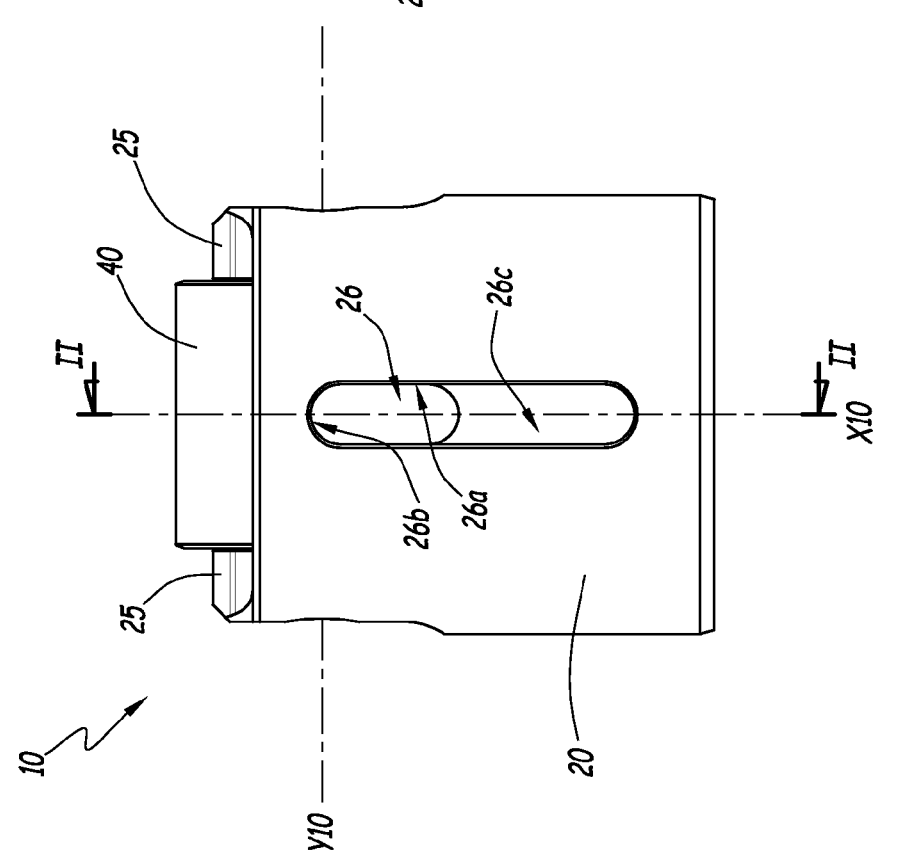

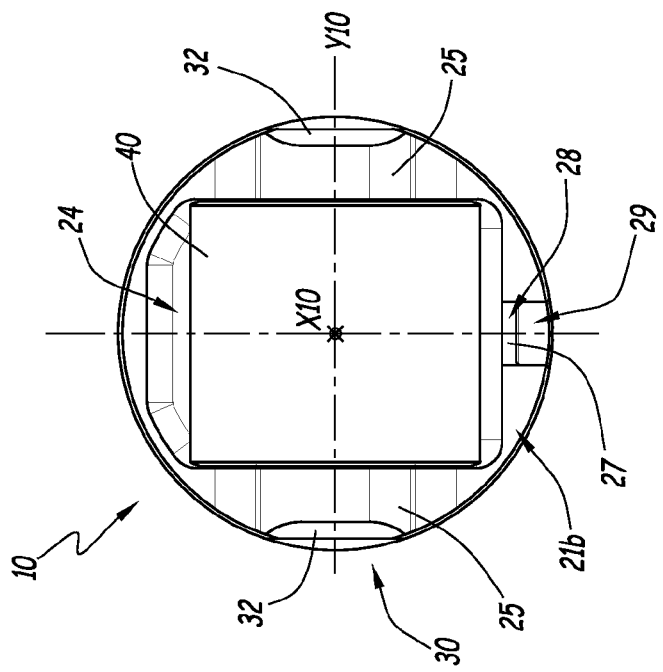
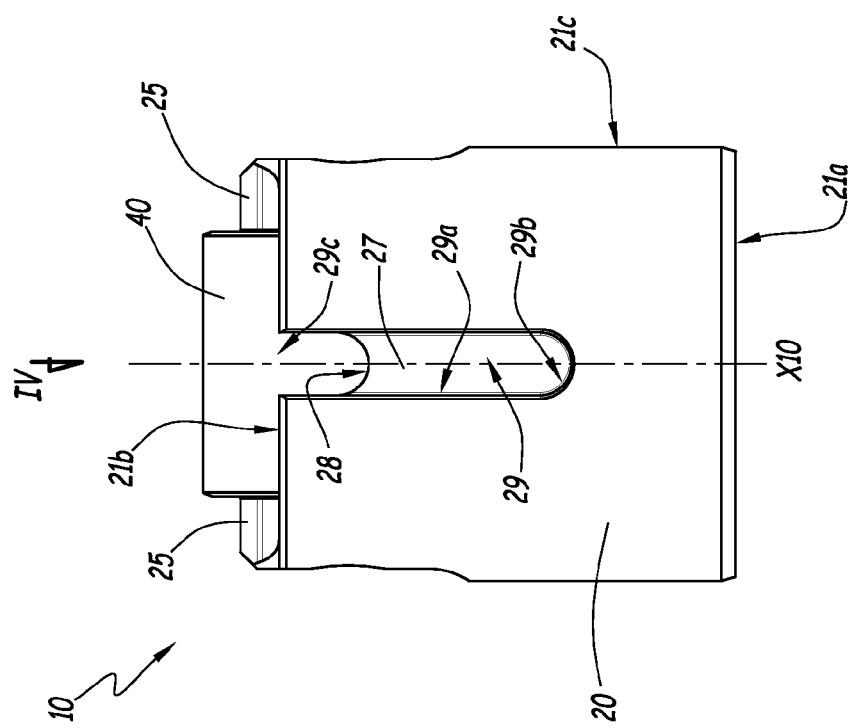

MECHANICAL SYSTEM FORMING A CAM FOLLOWER OR A ROCKER ARM, INCLUDING AN INNER CAVITY ADAPTED TO CONTAIN AN OIL BATH

CROSS REFERENCE TO RELATED APPLICATIONS

This is a Non-Provisional Patent Application, filed under the Paris Convention, claims the benefit of Europe Patent (EP) Application Number 14305754.5 filed on 22 May 2014, which is incorporated herein by reference in its entirety.

TECHNICAL FIELD OF THE INVENTION

The invention concerns a mechanical system, forming a cam follower or a rocker arm. The invention also concerns a follower device, an injection pump or a valve actuator, comprising such a mechanical system.

BACKGROUND OF THE INVENTION

Classically, a cam follower comprises at least a tappet, a pin and a roller. The tappet extends along a longitudinal axis, while the pin and the roller are centered on a transverse axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis, while the roller is movable in rotation around its central axis.

As shown by example in EP-A-2 607 636, it is known to provide the tappet with lubrication channels. Depending on the configuration and orientation of the cam follower, the oil lubricant flows freely or is projected via these channels toward the roller and the pin. The lubrication can be achieved simply by gravity when the roller is positioned downwards, but not when the roller is positioned upwards, relative to the tappet.

SUMMARY OF THE INVENTION

The aim of the invention is to provide an improved mechanical system, which can be lubricated by gravity when the roller is positioned upwards relative to the tappet.

To this end, the invention concerns a mechanical system, forming a cam follower or a rocker arm, the mechanical system comprising: a support element; a pin extending between two opposite ends along a first axis and supported by the support element; and a roller movable in rotation relative to the pin around the first axis and adapted to roll on a cam. According to the invention, the support element includes an inner cavity in which the roller is at least partially arranged and which is adapted to contain an oil bath for lubricating the roller.

Thanks to the invention, when the roller is positioned upwards relative to the tappet, the roller can be lubricated by the oil bath. The level of the oil bath in the inner cavity of the support element can be controlled to ensure a satisfactory lubrication of the interface between the roller and the cam.

If the mechanical system is a cam follower, the support element is a tappet movable along a longitudinal translation axis which is perpendicular to the first axis. If the mechanical system is a rocker arm, the support element is an arm movable in rotation along a pivot axis parallel to the first axis.

According to further aspects of the invention which are advantageous but not compulsory, such a mechanical system may incorporate one or several of the following features:

- The support element includes an inlet hole for conveying an upstream oil flow into the inner cavity of the support element.
- The inlet hole is a groove extending in a direction perpendicular to the first axis.
- The support element includes an outlet hole for conveying a downstream oil flow outside the inner cavity of the support element.
- The support element includes an overflow ledge for conveying a downstream oil flow outside the inner cavity of the support element.
- The support element includes a wall extending up to the overflow ledge and a groove formed between the wall and an outside surface of the support element.
- The overflow ledge is located set back in the inner cavity relative to an edge of the support element.
- The inner cavity is delimited in the support element by a side wall surrounding a second axis and a bottom wall extending transversely to the second axis, which is perpendicular to the first axis.
- The bottom wall delimiting the inner cavity is devoid of through holes.
- An inlet hole, an outlet hole and/or an overflow ledge are formed in the side wall delimiting the inner cavity.
- At least 80% of the roller is arranged inside the inner cavity of the support element.

The invention also concerns an injection pump for a motor vehicle, comprising a mechanical system as defined here-above.

The invention also concerns a valve actuator for a motor vehicle, comprising a mechanical system as defined here-above

BRIEF DESCRIPTION OF THE DRAWINGS

The invention will now be explained in correspondence with the annexed figures, and as an illustrative example, without restricting the object of the invention. In the annexed figures:

FIG. 1 is a side view of a mechanical system according to the invention, of the cam follower type;

FIG. 2 is a sectional view along line II-II of FIG. 1;

FIG. 3 is a side view along arrow III of FIG. 2;

FIG. 4 is an axial view along arrow IV of FIG. 3; and

DETAILED DESCRIPTION OF SOME EMBODIMENTS

Figure 5:
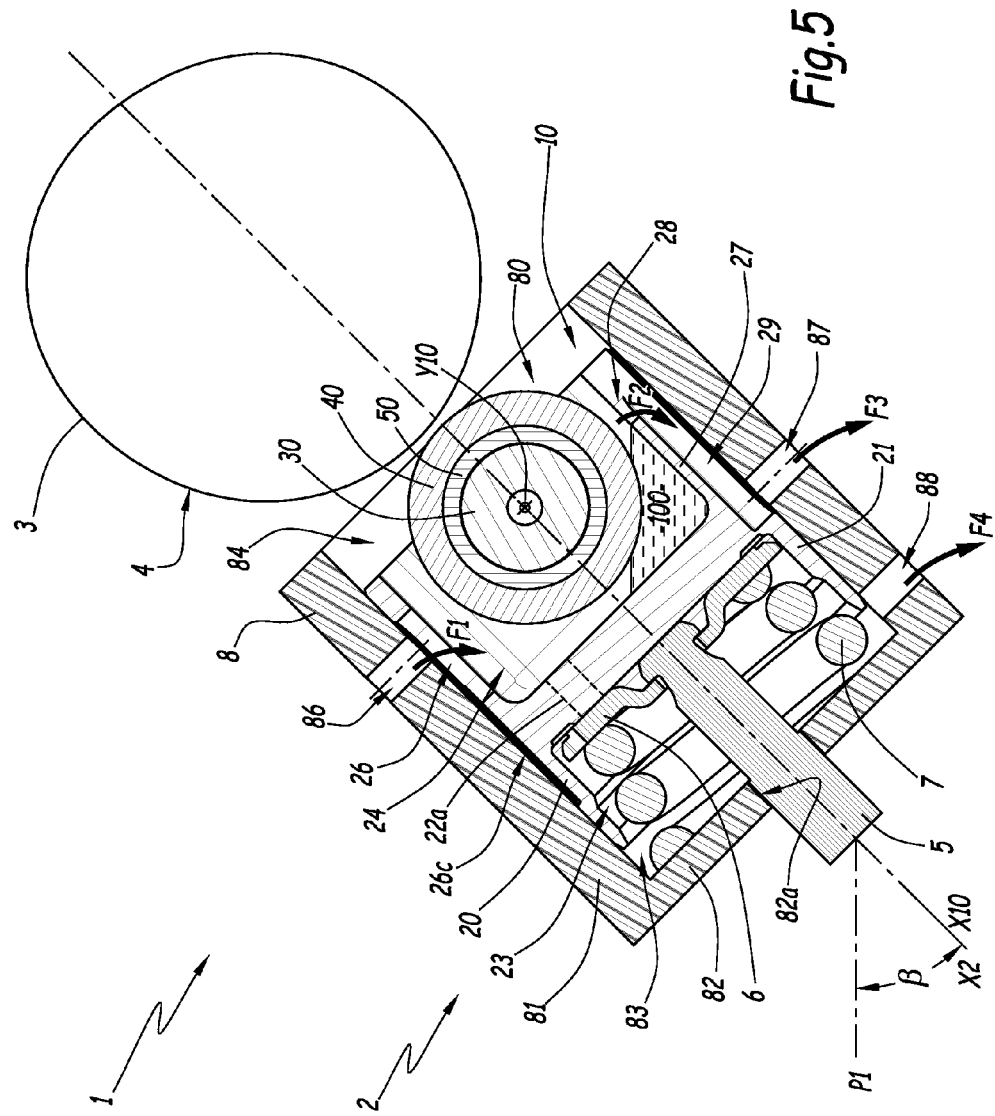
FIG. 5 is a sectional view similar to FIG. 2, showing the cam follower integrated in an injection pump for a motor vehicle.

The cam follower 10 represented on FIGS. 1 to 5 is adapted to equip an injection pump 1 or a valve actuator for a motor vehicle.

The injection pump 1 is partially shown on FIG. 5. The injection pump 1 includes a follower device 2 and a cam 3. Device 2 comprises a rod 5, a plate 6, a spring 7, a housing 8 and the cam follower 10. Device 2 has a longitudinal axis X2. Cam 3 has an outer surface 4 for cooperation with the cam follower 10. Together, rod 5 and plate 6 form a piston movable in translation with the cam follower 10.

Housing 8 includes an inner chamber 80 for receiving rod 5, plate 6, spring 7 and cam follower 10. Housing 8 comprises a cylindrical lateral portion 81 and a plane annular bottom portion 82, delimiting chamber 80 inside housing 8. Portion 81 is centered on axis X2, while portion 82 extends perpendicular to axis X2. Chamber 80 is separated in two parts 83 and 84 along axis X2, as detailed here-after. Cylindrical bores 86, 87 and 88 are formed perpendicular to axis X2 through portion 81, between chamber 80 and the outside of housing 8. Cylindrical bore 86 is located on one side of axis X2, while cylindrical bores 87 and 88 are located on the diametrically opposite side of axis X2. In other words, bore 86 on the one hand and bores 87 and 88 on the other hand are diametrically opposite relative to axis X2.

Cam follower 10 comprises a tappet 20, a pin 30, a roller 40 and a bush 50, together forming a plain bearing. Cam follower 10 has a longitudinal axis X10 and a transverse axis Y10, perpendicular relative to each other. When cam follower 10 is positioned in chamber 80 of housing 8, axis X10 merges with axis X2. Tappet 10 is centered on axis X10, while pin 30, roller 40 and bush 50 are centered on axis Y10.

Tappet 20 comprises a cylindrical outer portion 21 and a transverse central portion 22, delimiting two inner cavities 23 and 24 inside tappet 20. Portion 21 is centered on axis X10, while portion 22 extends perpendicular to axis X10. In other words, portion 21 surrounds axis X10 while portion 22 extends transversely to axis X10. Portion 21 has two opposite edges 21a and 21b, respectively located near cavities 23 and 24. Tappet 20 is adapted to slide along axis X10 in chamber 80 of housing 8. Portion 21 has an outer cylindrical surface 21c adapted to slide inside housing 8, in contact with portion 81. Cavities 23 and 24 are separated by portion 22. Cavity 23 is open near edge 21a and closed by portion 22. Cavity 23 receives the end of rod 5, plate 6 and spring 7, as shown on FIG. 5. Cavity 24 is open near edge 21b and closed by portion 22. Cavity 24 has a side wall 24a surrounding axis X10 and a bottom wall 24b extending transversely to axis X10. Cavity 24 receives pin 30, roller 40 and bush 50. Cavity 24 is adapted to contain an oil bath 100 for lubricating roller 40. In this regard, at least 40% of roller 40, preferably at least 80% of roller 40, is arranged inside cavity 24. According to a particular embodiment of the invention, even 100% of the roller is arranged inside cavity 24.

Tappet 20 forms a support element for pin 30, roller 40 and bush 50. To this end, tappet 20 comprises two lateral flanges 25 extending from portion 21 parallel to axis X10 in a bifurcated manner, on both side of axis X10. Each flange 25 includes a bore receiving pin 30. Pin 30 is fitted in flanges 25 for radial retention, i.e. retention in a direction radial to axis Y10. Pin 30 may be caulked in flanges 25 for axial retention, i.e. retention in a direction parallel to axis Y10.

Tappet 20 includes a groove 26 formed through portion 21, between side wall 24 of cavity 24 inside tappet 20 and surface 21c outside tappet 20. Groove 26 has two plane faces 26a and two concave curved ends 26b. Groove 26 extends parallel to axis X10 between ends 26b, which are located set back relative to edge 21b and bottom wall 24b. Groove 26 is closed at both ends 26b. A recess 26c is formed around groove 26 on surface 21c. Recess 26c extends parallel to axis X10, from end 26b located near edge 21c and beyond end 26b located near edge 21a. Recess 26c is longer than groove 26 in a direction parallel to axis X10 and thinner in a direction perpendicular to axis X10.

Tappet 20 includes a wall 27 formed in portion 21 and along cavity 24. Wall 27 extends parallel to a plane including axes X10 and Y10, from portion 22 up to an overflow ledge 28. Wall 27 and portion 21 form together the side wall 24a of cavity 24. Ledge 28 of wall 27 is located set back in cavity 24 relative to edge 21b. Ledge 28 has a concave curved shape. Tappet 20 also includes a groove 29 formed in portion 21, between wall 27 and surface 21c outside tappet 20. Groove 29 has two plane faces 29a and two ends 29b and 29c. End 29b is located near portion 22 and has a concave curved shape, while end 29c is opened at edge 21b. In other words, groove 29 has a closed end 29b and an open end 29c along a direction parallel to axis X10. Ledge 28 is located between ends 29n and 29c along axis X10.

Groove 26 is located on one side of axis X10, while wall 27, ledge 28 and groove 29 are located on the diametrically opposite side of axis X10. In other words, groove 26 on the one hand and wall 27, ledge 28 and groove 29 on the other hand are diametrically opposite relative to axis X10.

Pin 30 has a cylindrical outer surface 31 extending between two pin ends 32. Roller 40 has an outer cylindrical surface 41 and an inner cylindrical bore 42. Bush 50 has an outer cylindrical surface 51 and an inner cylindrical bore 52. During assembly of cam follower 10, surface 51 of bush 50 is adjusted with bore 42 of roller 40, while surface 31 of pin 30 is adjusted with bore 52 of bush 50, such that roller 40 is movable in rotation relative to pin 30 around axis Y10. Tappet 20 supports pin 30, which supports bush 50, which supports roller 40. Pin, roller and bush axes merge with axis Y10. Roller 40 is then adapted to roll on cam 3. More precisely, surface 41 can roll on outer surface 4 of cam 3.

Alternatively, bush 50 may be replaced by a rolling bearing including a series of needles or rollers distributed around axis Y10 between pin 30 and roller 40.

According to another alternative, cam follower 10 is not equipped with a bush 50 or a rolling bearing. In this case, surface 32 of pin 30 is adjusted with bore 42 of roller 40.

FIG. 5 shows cam follower 10 integrated in injection pump 1. Cam follower 10 is positioned in chamber 80 of housing 8. Merged axes X2 and X10 are inclined at an angle β of 45 degrees relative to a horizontal plane P1. Roller 40 is positioned upwards relative to tappet 20.

Lower part 83 of chamber 80 receives the lower part of tappet 20, in other words the lower part of portion 21 located below portion 22 and delimiting cavity 23. Part 83 and cavity 23 receives the end of rod 5, plate 6 and spring 7. Rod 5 is movable back and forth along axis X2 through a bore 82a formed in this respect in bottom portion 82 of housing 8. Rod 5 and plate 6 are bearing against portion 22 of tappet 20. Spring 7 is bearing against plate 6. When roller 40 rolls on cam 3, follower device 2 is actuated in a known manner.

Upper part 84 of chamber 80 receives the upper part of tappet 20, in other words the upper part of portion 21 located above portion 22 and delimiting with cavity 24. Part 84 also receives flanges 25, groove 26, wall 27, ledge 28, groove 29, pin 30, roller 40 and bush 50.

An upstream oil flow F1 is conveyed through bore 86, then groove 26, into cavity 24. Thus, cavity 24 can be partly filled with an oil bath 100, for lubricating roller 40 and its surroundings, including the interface between roller 40 and cam 3. Oil bath 100 is retained in cavity 24 by side wall 24a, including wall 27, and by bottom wall 24b.

Preferably, a through hole 22a is arranged through portion 22 to connect lower part 83 and upper part 84 of chamber 80, to avoid over-pressure of lubricant inside lower part 83. Through hole 22a is arranged as much upwardly as possible, that is close to bore 86, and preferably upwardly enough so as not to be in the area of oil bath 100.

However, according to another embodiment of the invention, case portion 22 and bottom wall 24b are devoid of through holes.

The level of oil bath 100 in cavity 24 is controlled thanks to overflow ledge 28. A downstream oil flow F2 is discharged above wall 27 and overflow ledge 28, flowing from cavity 24 to groove 29, then along portion 81 of housing 8 toward bore 87. A downstream oil flow F3 is conveyed through bore 87 outside part 84 of chamber 80.

Recess 26a allows some oil to flow from bore 86 toward lower part 83 of chamber 80, for lubricating, on the one hand, the interface between surface 21c and portion 81 and, on the other hand, elements 5, 6 and 7 located in chamber 83. A downstream oil flow F4 is conveyed through bore 88 outside part 83 of chamber 80

Thus, cam follower 10 is lubricated thanks to oil bath 100 and to oil flows F1, F2, F3 and F4 conveyed by gravity. Inlet holes 26 and 86 are positioned above oil bath 100, which is located above outlet holes 29, 87 and 88. Downstream oil flows F3 and F4 can be recovered for generating upstream oil flow F1.

Thanks to the invention, roller 40 and its surroundings can be easily and efficiently lubricated when this roller 40 is positioned upwards relative to tappet 10.

Other non-shown embodiments can be implemented within the scope of the invention. In particular, positions and/or shapes of elements 26, 27, 28, 29, 86, 87 and 88 may be different from FIG. 5.

Moreover, the mechanical system 10 according to the invention is not limited to a cam follower. By example, the mechanical system 10 may form a rocker arm, wherein the support element 20 is an arm movable in rotation along a pivot axis parallel to axis Y10.

According to a non-shown embodiment, instead of the groove 26, the tappet 20 may include an inlet hole 26 for conveying the upstream oil flow F1 into the inner cavity 24 of the tappet 20 and into the oil bath 100.

According to another non-shown embodiment, instead of the overflow ledge 28, the tappet 20 may include an outlet hole for conveying the downstream oil flow F2 out of the oil bath 100 and outside the inner cavity 24 of the tappet 20.

According to another non-shown embodiment, angle β may be comprised between 0 and 90 degrees, with roller 40 positioned upwards relative to tappet 20. In this case, positions and/or shapes of elements 26, 27, 28, 29, 86, 87 and/or 88 may be different from FIG. 5.

Whatever the embodiment, the tappet 20 of the cam follower 10 includes an inner cavity 24 in which the roller 40 is at least partially arranged and which is adapted to contain an oil bath 100 for lubricating the roller 40.

In addition, technical features of the different embodiments can be, in whole or part, combined with each other. Thus, the cam follower 10 can be adapted to the specific requirements of the application.

The invention claimed is:
1. A mechanical system, forming a cam follower or a rocker arm, the mechanical system comprising:
a support element including an inner cavity;
a pin extending between two opposite ends along a first axis and supported by the support element; and
a roller movable in rotation relative to the pin around the first axis and adapted to roll on a cam;
wherein the roller is at least partially arranged within the inner cavity, and
wherein the inner cavity is adapted to contain an oil bath for lubricating the roller such that oil comprising the oil bath exits the inner cavity in a direction parallel with respect to a rolling direction of the roller at a location in line with a substantially center portion of the roller.

2. The mechanical system according to claim 1, the support element further comprising an inlet hole for conveying an upstream oil flow into the inner cavity of the support element.

3. The mechanical system according to claim 2, wherein the inlet hole is a groove extending in a direction perpendicular to the first axis.

4. The mechanical system according to claim 1, the support element further comprising an outlet hole for conveying a downstream oil flow outside the inner cavity of the support element.

5. The mechanical system according to claim 1, the support element further comprising an overflow ledge for conveying a downstream oil flow outside the inner cavity of the support element.

6. The mechanical system according to claim 5, the support element further comprising a wall extending up to the overflow ledge and a groove formed between the wall and an outside surface of the support element.

7. The mechanical system according to claim 6, wherein the overflow ledge is located set back in the inner cavity relative to an edge of the support element.

8. The mechanical system according to claim 5, wherein the overflow ledge is located set back in the inner cavity relative to an edge of the support element.

9. The mechanical system according to claim 1, wherein the inner cavity is delimited in the support element by a side wall surrounding a second axis and a bottom wall extending transversely to the second axis, wherein the second axis is perpendicular to the first axis.

10. The mechanical system according to claim 9, wherein the bottom wall delimiting the inner cavity is devoid of through holes.

11. The mechanical system according to claim 10, wherein at least one of an inlet hole, an outlet hole, and an overflow ledge are formed in the side wall delimiting the inner cavity.

12. The mechanical system according to claim 9, wherein at least one of an inlet hole, an outlet hole and an overflow ledge are formed in the side wall delimiting the inner cavity.

13. The mechanical system according to claim 1, wherein at least 80% of the roller is arranged inside the inner cavity of the support element.

14. The mechanical system according to claim 1, wherein the mechanical system is integrated into an injection pump for a motor vehicle.

15. The mechanical system according to claim 1, wherein the mechanical system is integrated into a valve actuator for a motor vehicle.

16. A follower device, comprising:
a piston;
a spring;
a mechanical system which forms a cam follower, the mechanical system including:
a support element including an inner cavity;
a pin extending between two opposite ends along a first axis and supported by the support element; and a roller movable in rotation relative to the pin around the first axis and adapted to roll on a cam;

wherein the roller is at least partially arranged within the inner cavity, and wherein the inner cavity is adapted to contain an oil bath for lubricating the roller such that oil comprising the oil bath exits the inner cavity in a direction parallel with respect to a rolling direction of the roller at a location in line with a substantially center potion of the roller; and a housing, wherein the piston, the spring and the mechanical system are at least partly located in a chamber of the housing.

17. The follower device according to claim 16, wherein the chamber is delimited in the housing by a lateral portion surrounding a second axis and a bottom portion extending transversely to the second axis, wherein the second axis is perpendicular to the first axis, and wherein an inlet hole and at least one outlet hole are formed in the lateral portion for conveying an oil flow through the chamber.

\* \* \* \* \*